(No Model.) 2 Sheets—Sheet 2.

A. G. BROWN.
EVENER FOR VEHICLES.

No. 379,932. Patented Mar. 27, 1888.

Witnesses.
Fred Haller.
H. J. England.

Inventor.
Alfred G. Brown.
by
E. H. Gelston.
Attorney.

UNITED STATES PATENT OFFICE.

ALFRED G. BROWN, OF EGAN, DAKOTA TERRITORY.

EVENER FOR VEHICLES.

SPECIFICATION forming part of Letters Patent No. 379,932, dated March 27, 1888.

Application filed September 16, 1887. Serial No. 249,833. (No model.)

*To all whom it may concern:*

Be it known that I, ALFRED G. BROWN, a citizen of the United States, residing at Egan, in the county of Moody and Territory of Dakota, have invented certain new and useful Improvements in Eveners for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in draft-eveners for moving reaping-machines or vehicles.

It consists in a long and short evener, a pole, a wear-plate and short evener, connecting-rods, and an adjustable bar connecting the vehicle, pole, and eveners, the object of my invention being to equalize the draft of the animals used, which are usually four in number, attached by whiffletrees to the eveners. I attain this object by means of the peculiar construction and arrangement of the various parts of my invention, which will be more fully pointed out and described in the specification and claims, reference being had to the drawings accompanying this application and forming part of the same, in which—

Figure 1:
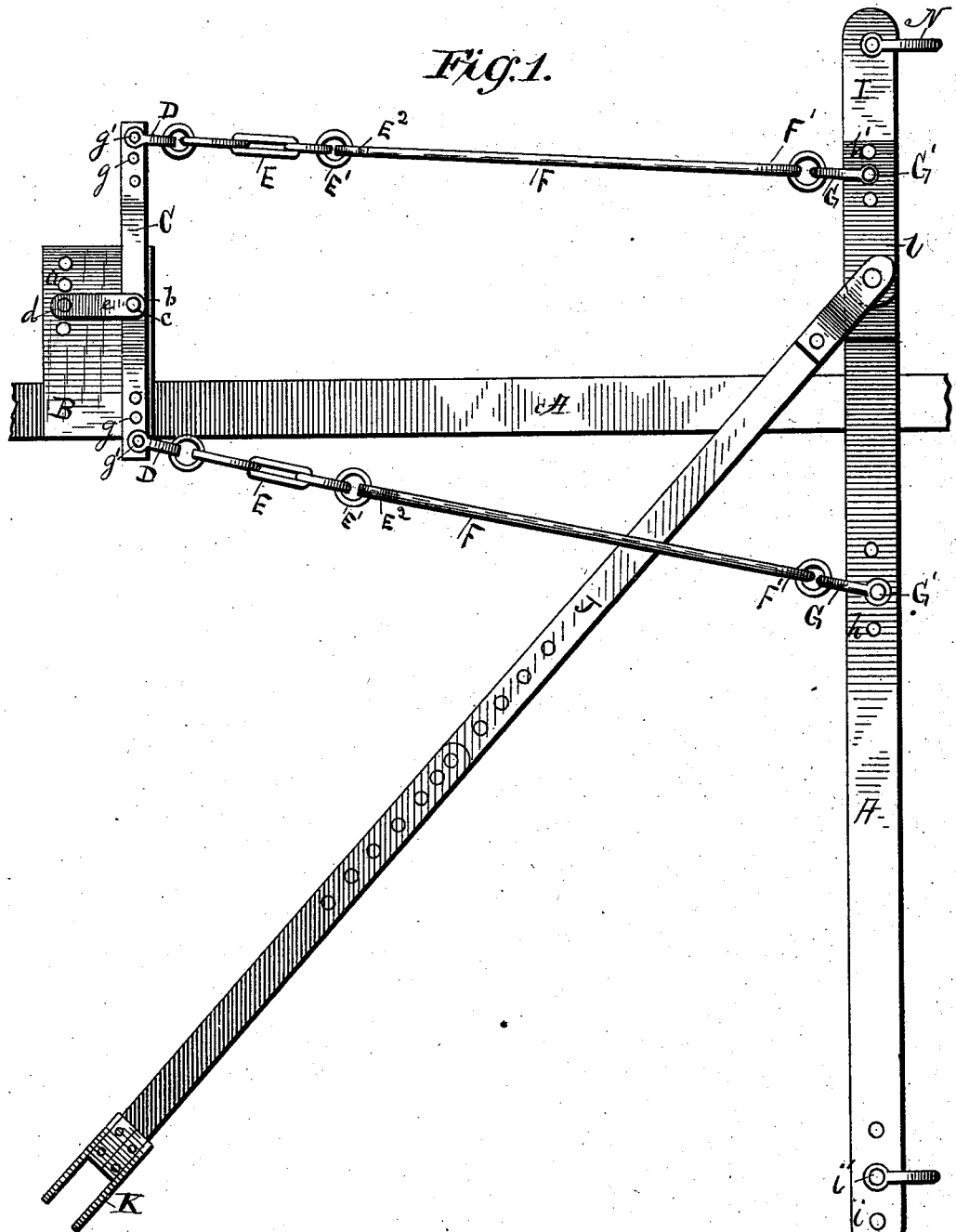
Figure 2:
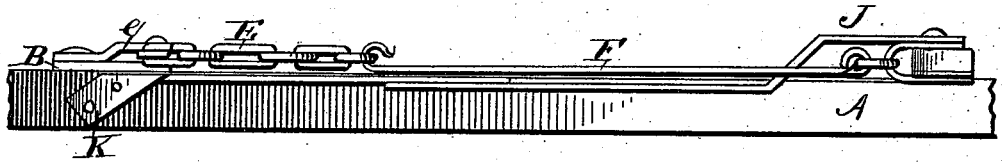
Figure 3:
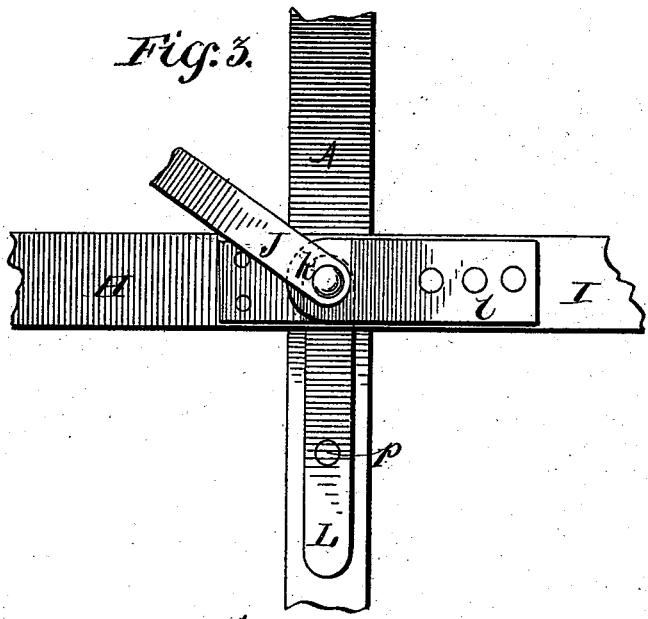
Figure 4:
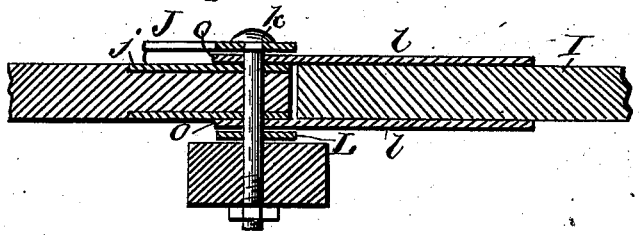

Figure 1 is a top plan view of my invention. Fig. 2 is a side elevation of the same, and Figs. 3 and 4 are detail views.

Similar letters refer to like parts throughout the drawings.

Referring to the drawings, A represents the pole of a vehicle or reaping-machine or other farm implement requiring two or more horses to operate. A wear-plate, B, is secured to pole A, near its inner end, by screw-bolts or other suitable means. Said plate B is perforated at right angles to pole A on two lines, $a$ and $b$. Perforations on line $a$ are to receive the whiffletree-bolt $c$, and the opposite perforations, $b$, to receive bolt $d$, passing through the opposite end of hammer-strap $e$. Evener C is placed horizontally across plate B, and has a perforation, $f$, formed at a point about one-third its length to receive bolt $c$. The outer ends of said evener C are provided with a series of perforations, $g$, to receive pins or bolts $g'$, that pass through the perforated ends of clevises D, by means of which said clevises are adjustable horizontally on said evener C. Chain-links E are secured to clevises D, terminating in rings E', adapted to engage with hooks $E^2$, formed on the ends of rods F. The opposite ends of rods F are also provided with hooks F', which are formed to engage with clevises G, said clevises having end perforations and provided with bolts G', which are adapted to enter either of a series of perforations, $h$ and $h'$, formed in the long and short eveners H and I. The perforations $h$ are formed in evener H about one-third its length from its inner end, and its outer end is formed with perforations $i$ to receive the clevis-bolt $i'$. The inner end of evener H is formed with an end clip-band, $j$, and a central perforation to receive bolt $k$. The inner end of short evener I has a like inner end formation, $l$, with perforation to receive clevis-bolt G, and the outer end of evener I is formed with a perforation to receive clevis-bolt $n$. The inner end of evener I has the metal formation $l$ extending out beyond the end of the evener at top and bottom, forming lips $o$, that are perforated to register with the perforation in the inner end of evener H, which is placed between the lips $o$, which are then placed between the forked ends of the flat connecting-rod J. A pivot-bolt, $k$, is then inserted, which binds the parts loosely together.

Connecting-rod J is formed in two parts, and the lapped ends are perforated and held by bolts for the purpose of making it adjustable lengthwise. The opposite end of rod J is formed with an extension-clip, K, having perforated sides adapted to connect with a harvester-frame or vehicle at the distance to the right of the pole to equalize the strain of the eveners.

A flat extension-plate, L, is secured at one end to pivot-bolt $k$, and the outer end is pivoted to the outer end of the pole by pivot-pin $p$, thus stiffening the pole and forming end bearings for eveners H and I.

The draft-animals are attached to the clevises on the outer ends of eveners H and I.

The operation of the device is obvious and needs no explanation.

Having described my invention, what I claim, and desire to secure by Letters Patent, is—

In a draft-equalizer, a vehicle-pole having a draft-plate secured to its inner end, provided with a series of perforations and projecting outward at one side of said pole, an evener centrally pivoted thereto, one end of which is secured by rings, links, and a rod to a long evener that is horizontally pivoted to a short evener which is connected by rings, links, and a rod to the short evener on said plate, the outer ends of each evener being provided with draft-clevises, a flat connecting-rod connected to the pivot-bolt of the long and short levers and longitudinally adjustable by central perforations and bolts, and its opposite end connected in a diagonal line by clip-strap to a vehicle, substantially as shown and described.

In testimony whereof I affix my signature in presence of two witnesses.

ALFRED G. BROWN.

Witnesses:
GEO. M. SMITH,
J. TORGARSON.